D. GERBER.
CAR TRUCK.
APPLICATION FILED SEPT. 21, 1907.

1,007,686.

Patented Nov. 7, 1911.
5 SHEETS—SHEET 1.

Witnesses:
Harry I. Gaither
Wm. C. Freudenreich Inventor:
Dwight Gerber
by Walter H. Chamberlin
his Attorney

UNITED STATES PATENT OFFICE.

DWIGHT GERBER, OF ALLEGHENY, PENNSYLVANIA.

CAR-TRUCK.

1,007,686.  Specification of Letters Patent.  Patented Nov. 7, 1911.

Application filed September 21, 1907. Serial No. 393,964.

*To all whom it may concern:*

Be it known that I, DWIGHT GERBER, a citizen of the United States, residing at Allegheny, county of Allegheny, State of Pennsylvania, have invented a certain new and useful Improvement in Car-Trucks; and declare the following to be a full, clear, and exact description of the same, such as will enable others skilled in the art to which it pertains to make and use the same, reference being had to the accompanying drawings, which form a part of this specification.

My invention relates to trucks for railway cars and has for its object to improve the same.

One of the points of weakness and a source of trouble in car trucks is the connection between the journal boxes and side frames, it being necessary that both the journal box and its fastening means be made strong enough to withstand the various stresses to which they are subjected. Not only is it difficult to make the journal boxes and the fastening means themselves sufficiently strong, but the necessity of securing the journal boxes to the ends of the frames weakens the frames and increases the effective lengths of the frames acting as trusses which span the journal boxes.

One of the objects of the present invention is to provide a truck in which the weaknesses and objectionable features incident to the attachment of journal boxes to the side frames are eliminated, without thereby introducing further objectionable features. To this end I propose to form on the ends of the side frames, themselves, the portions of the journal boxes which are required to withstand the principal shocks and stresses to which the journal bearings are subjected. The remaining portions of the journal boxes may then be made as separate elements which can conveniently be secured in place in such a manner and by such means that no portion of the main structure is in any wise weakened. I prefer to separate each journal box between the top and bottom thereof along such lines that all of the lugs or shoulders which engage with, or act as, the bearing members are left within the portion of the journal box which forms an integral part of the frame. Thus, in the case of the ordinary railway truck, the crown portion of the box would be made to contain the lugs for engaging the bearing brass and the lug or lugs for engaging the wedge. The remaining portion of the box need therefore be nothing more than a light housing or cellar for the purpose of inclosing the journal and retaining the lubricating material. As this cellar will not be subjected to any great stresses during ordinary service, the means for securing it in place does not offer the same problem that is presented in the case of a journal box which must be secured as a whole to the truck frame.

Another feature to which the present invention relates is the means for retaining the bolster of a truck in place; one of the objects of my invention being to provide a truck within which any desired type of bolster may be fitted, and wherein it is possible to introduce the bolster through the side of the truck frame. To this end I provide each of the truck frames with a substantially rectangular opening or window intermediate the ends thereof, the window being of such width as to be capable of receiving the end of the widest bolster which it is intended to use. Between the usual springs and the bolster I provide a spring cap having the additional function of a filler for filling up the space which may exist between each side of the bolster and the adjacent side of the window. Any type of bolster may be effectively employed by selecting a spring cap of the proper design and, when it is desired to replace one type of bolster by another, it is only necessary to design a new spring cap. I also propose to make use of the combined spring cap and filler to lock the bolster in position in the truck, preferably in such a manner that wear on the bolster due to chafing is prevented, such wear being taken instead by the spring cap which may readily be renewed. Car trucks are sometimes arranged so that when passing around curves the bolsters are permitted to shift laterally a slight extent and in so doing produce an elevation of the car body, the tangential effort of the car body being thus gradually absorbed and sudden jars and shocks being avoided.

My invention also contemplates a novel arrangement whereby the gradual checking of the momentum of a car body in the tangential direction is effected in a more efficient and reliable manner than has heretofore been possible. To this end I place between each end of the bolster and the truck frame one or more rollers having bearing seats on the bolster and on the truck frame so arranged that, when the car body moves laterally in one direction from its normal position one side only of the car is elevated, while upon a similar movement of the car body in the other direction the other side only is elevated. In other words, the car body is tilted relatively to the truck in the same manner that the car as a whole is tilted with respect to a level surface at the curve around which the car is passing.

The various features of novelty which characterize my invention will be hereinafter pointed out with particularity in the claims; but, for a full understanding of my invention in its various aspects, reference is to be had to the following detailed description taken in connection with the accompanying drawings, wherein:

The truck shown in the drawings is of the usual four-wheeled type, having a pair of similar side frames A spanning a pair of axles A'—A'.

B is a bolster of any usual or preferred type resiliently supported by the side frames between and parallel with the axles. Instead of having a journal box detachably secured to each end of each of the side frames, I form the main portions of the journal boxes directly in the frame structure, so that there are no joints between the parts carrying the journal bearings and the side frames of the truck. This feature of my invention is most clearly illustrated in Figs. 1 and 2 and in Figs. 8 to 16 inclusive. Referring to these figures, it will be seen that the crown C' of each journal box C forms an integral part of a frame end; the crown consisting of the top wall $c'$ and portions of two side walls $c^2$. A portion of the back wall $c^3$ is preferably also part of the main frame. The frames are intended to be made of cast metal so that each side frame with its two journal box crowns may be formed in a single operation. Coöperating with the crown to complete the journal box is a cellar $C^2$ which may be made of any suitable material, being either cast or stamped out of sheet metal, as may be desired. The line of division between the crown and the cellar is such that all of the lugs or shoulders which are intended to hold the parts of the bearing in place are located upon the crown, whereby all of the main stresses are carried directly by the part of the journal box integral with the frame. The cellar under normal conditions simply acts as a housing for the journal and neither it nor its fastening means need be designed to bear the heavy strain to which the main portion of the journal box is subjected. The journal box illustrated is intended for use in connection with bearings of the ordinary kind, wherein there is a bearing brass D which rests directly upon the journal $A^2$ upon the end of the axle; there being a wedge member D' between the bearing brass and the top wall of the journal box. It will, of course be understood, however, that the bearing illustrated is simply indicative of bearings in general, and that my invention is not limited in its application to journal boxes designed for use with bearings of this particular type. Projecting downwardly from the front end of the top wall of the journal box are a pair of lugs $c^4$ which are adapted to engage the outer edge of the wedge member and prevent it from being thrust outwardly through the journal box. Projecting inwardly from the side walls of the crown member are a pair of lugs or shoulders $c^5$ which are adapted to engage with and secure in place the bearing brass. The line of division between the crown and the cellar is therefore made such as to just clear these several lugs, in order that the depth of the crown member be no greater than is necessary. The cellar and crown are preferably united by means of an overlapping joint of some sort in order to make a tight closure between them. A simple and convenient method of joining these parts consists in making the walls of the crown somewhat thicker than the walls of the cellar and forming a rabbet $c^6$ in the lower edge of the side walls of the crown, this rabbet being of such width as to permit the cellar to be slipped into place with its interior surfaces flush with the interior of the side walls of the crown. Furthermore, the lugs $c^4$ and the lower ends of the lugs $c^5$ preferably engage with the inner surfaces of the side walls of the cellar and lock it securely against lateral displacement. The cellar is fastened to the crown member by means of a pair of bolts E and E', similar to the bolts which are ordinarily employed to hold the journal boxes to the frames. However, since these bolts do not bear the strain which is transmitted to the lugs $c^4$ and $c^5$ as is the case in the ordinary construction, they need not be made heavy; and furthermore, because of the absence of a joint between the main portion of the journal box and the frame, the bolts are shorter than usual. The bolt E is applied through the end of the frame adjacent the outer wall of the crown in the usual manner and, after passing through a depression $c^7$ in the side wall of the cellar, projects through the end of the bottom tie bar or strut F. The bolt E' is applied in an entirely novel manner which permits it to be readily and conveniently inserted and removed, while at the same time it is situated in a most advantageous manner for stiffening purposes. Instead of threading this bolt through a cylindrical hole, as in the case of the other bolt, I provide a passage $a$ which is open at one side so that the bolt may be inserted sidewise. The center of this passage is approximately on the center line of the main web $A^3$ of the frame. It is not necessary that the passage be thus formed entirely through the comparatively thin lower cord $A^4$ of the frame, but is sufficient if the opening in this cord is made somewhat larger than the bolt and perhaps tapered, if desired, as at $a'$. By this arrangement the structure of the web-like lower cord where it joins the crown of the journal box is not appreciably diminished. The bolt can very readily be threaded through the opening $a'$ and the upper end carried laterally until it enters the main opening $a$. The lower end of the bolt passes through a second depression $c^7$ in the side of the cellar and thence through the tie-bar or strut F, in the same manner as the bolt E. This method of inserting the bolt permits it to be applied directly upon the top wall $c'$ of the journal box instead of having its head rest upon the top of the frame, as would be the case if the bolt were threaded through a cylindrical hole in the frame. Furthermore, the upper portion of the frame remains unbroken and the frame therefore has its full strength at the point at which it is needed.

In order to stiffen the frame about the bolt opening, I provide a rib $A^5$ on the outer side of the web $A^3$ as a continuation of the top wall of the journal box. I also provide a similar rib $A^6$ projecting from the upper inner edge of the top of the journal box diagonally across the axial line of the bolt E' to the top cord $A^7$ of the frame. At the points where it is necessary to cut away the web $A^3$ in order to provide room for the bolt and bolt head I form a tubular boss $A^8$ extending upwardly from the top of the journal box and from the rib $a^5$ and closed at its top and three sides; the other side of this boss being left open for the admission of the bolt. The boss is so shaped that, after the bolt has been placed in position, the head is prevented from turning through engagement thereof with the interior of the boss. Between the rib $A^5$ and the bottom cord $A^4$ is formed a second boss $A^9$ which extends simply from the web to the adjacent side wall of the journal box. If desired, a third boss $A^{10}$ may be placed beneath the lower cord $A^4$ about the opening $a'$. It will be seen that the coring of the frame required for the admission of the inner bolt E' does not in any way weaken the frame; but on the other hand, the frame is materially strengthened due to the stiffening ribs and bosses which are provided.

The tie-bar or strut F is preferably formed of channel iron which is flattened out and fashioned near its end as at $f$ so as to snugly fit around the bottom of the cellar. At a point directly beneath the cellar, the strut is preferably provided with a boss $f'$ which may be circular in outline or have any other desired shape; this boss being adapted to engage the head of a jack or the like, when for any purpose it is necessary to raise the journal box or the portion of the truck adjacent the journal box. It will, of course, be understood, however, that the strut need not be made of channel iron if some other cross-section be desired.

It will now be seen that I have provided, not only a side frame for a truck wherein the main portions of the journal boxes are integral with the same, and wherein due to the omission of the joint between the journal box and the frame the effective length of the span of the side frame as a truss member is diminished, but also an improved journal box, irrespective of its connection with the side frame of a truck, in which journal box there is a main crown portion which bears the principal strains and a cellar portion which is entirely auxiliary to the crown portion and serves principally to house the journal and contain lubricant therefor. To further simplify the side frame with its attached crown pieces, I prefer to secure the usual journal box lids G, G to the cellar members of the journal boxes instead of to the crowns; thereby obviating the necessity for lugs or other attaching devices cast integral with the crown. I have shown such a lid and its attaching means in Figs. 1, 8, and 9. The lid proper may take any desired shape, such that it will fit closely upon the outer edges of the crown and cellar as indicated. A convenient way of supporting the lid consists in securing a bracket $g$ to one side of the cellar and providing integral trunnions $g'$ on the bracket. A casting $g^2$ having trunnion-engaging sockets is secured to the lid and is held in place by means of a suitable spring $g^3$. If the lid is made of sheet metal it can be placed in position and its upper edge $g^4$ hammered until it fits snugly about the upper corner of the front edge of the crown. In this way a perfectly tight closure for the open end of the journal box is provided.

Figure 23:
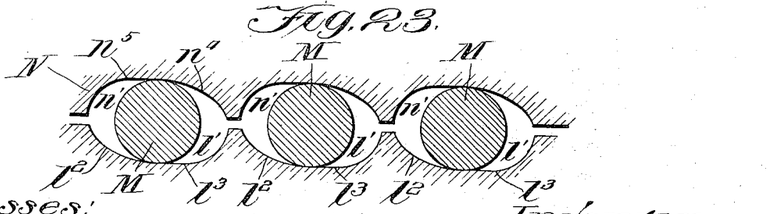
Fig. 23 shows diagrammatically on a large scale one of the roller bearings between the truck frame and the bolster.

In Figs. 1 to 7, and in Fig. 23, are illustrated two other features of the present invention, the means for attaching the bolster and the means for elevating one side of a car with respect to the truck when going around curves. Each side frame is provided with a large rectangular opening or window H of such width as to accommodate the end of the widest bolster which it may be desired to employ. Supported within the lower ends of the windows, upon the usual spring plank I, are suitable springs K. L is a spring cap which is provided on its sides near the inner end thereof with a pair of lugs $l$ which are adapted to engage with the inner face of the frame surrounding the window. These lugs or shoulders prevent the spring cap from being forced outwardly through the side frame. In the upper face of the spring cap are a number of grooves $l'$, these grooves being arranged parallel with the plane of the side frame. These grooves, three of which are indicated, serve as bottom seats for elongated rollers M, one of these rollers being seated within each groove. The grooves are of peculiar construction, (as will be hereinafter described,) so that when the rollers move laterally from a neutral position toward the outside of the truck they are elevated, but upon moving inwardly from the neutral position they do not change their elevation. Resting upon the top of the rollers M is a second plate N having grooves $n'$ which correspond with the grooves $l'$ and are shaped to cause a vertical movement of the plate N relative to the rollers similar to the vertical movement of the rollers upon the spring cap. The plate N may form part of the bolster, or it may be a member separate from the bolster, as indicated, the bolster being simply supported thereby. Where the plate N is separate from the bolster, it is preferably provided with upwardly projecting arms $n^2$, one on each side, in alinement with and engaging the sides of the window.

The bolster is adapted to rest upon the plate between the two arms. The arms therefore act as fillers between the frame and the bolster, and, by properly designing the arms, any desired form of bolster may be used in the same truck, it being only necessary to make the arms thicker or thinner as occasion may require. It will therefore be seen that, in case it is necessary to remove a bolster of one type and replace it by another, the only alterations which are required are in the plates N; and, by having a number of different types of these plates at hand, the proper plate may quickly be selected and the truck assembled. The bolster should be locked to the plate N so as to move therewith in order that an elevation of one end of the bolster may be effected in proceeding about a curve. This locking connection may be made in any desired way, as for example, the bolster may be provided with chafing plates $b$ bent up so as to form shoulders $b'$ on opposite sides of the arms $n^2$. The locking of the bolster to the plate also serves to shield the bolster against wear which would otherwise take place on the bolster, were it allowed to engage directly with the truck frame. Each of the plates N is provided with a lug $n^3$ projecting downwardly from its inner edge, whereby, when a predetermined relative movement in one direction has been effected between the plates L and N, the further movement is arrested due to the engagement of the lug $n^3$ with the side of the plate L. It will thus be seen that the bolster is permitted to move laterally of the truck within predetermined limits, but is prevented from becoming unseated, due to the engagement of the lug $n^3$ with the spring cap and the engagement of the lug $l$ on the spring cap with the side frame. As the bolster moves laterally from its central position in one direction or the other, the end corresponding to the direction of movement is gradually elevated and one side of the car is correspondingly elevated: thus all shocks due to the impact effected by the momentum of the car in the tangential direction in passing around a curve are prevented, the momentum being gradually overcome by lifting the proper side of the car.

In Fig. 23 I have shown on an enlarged scale the shape of the roller, seats in the spring cap and the plate N. In this figure, the parts are all shown in their normal or neutral positions, namely, positions which they occupy while the car is traveling along a straight piece of road. In case a curve is encountered which causes the car body to move the bolster and the plate N toward the left, the rollers M ride up the gradually curving inclines $l^2$ forming one side of the grooves $l'$, while at the same time the gradually inclined portions $n^4$ of the grooves $n'$ ride upwardly upon the rollers M; whereby the plate N and the corresponding end of the bolster is caused to be elevated a distance equal to the sum of the elevation of the rollers by the inclines $l^2$ and the elevation of the plate N due to the inclines $n^4$. If, on the other hand, the curve is in such direction as to cause the place N to be moved toward the right, the rollers will ride upon the level surfaces $l^3$ and no elevation of the rollers will occur. At the same time the rollers will travel beneath the level surfaces $n^5$ in the grooves $n'$ and no lifting of the plate N with respect to the rollers takes place. The sets of members L and N on each truck are right and left handed, so that, while one set of rollers is riding up the inclines, the set at the opposite end of the bolster is rolling upon the level portion of the grooves; and similarly, the same action takes place with respect to the grooves $n'$.

Figures 4, 5, 6, 7:
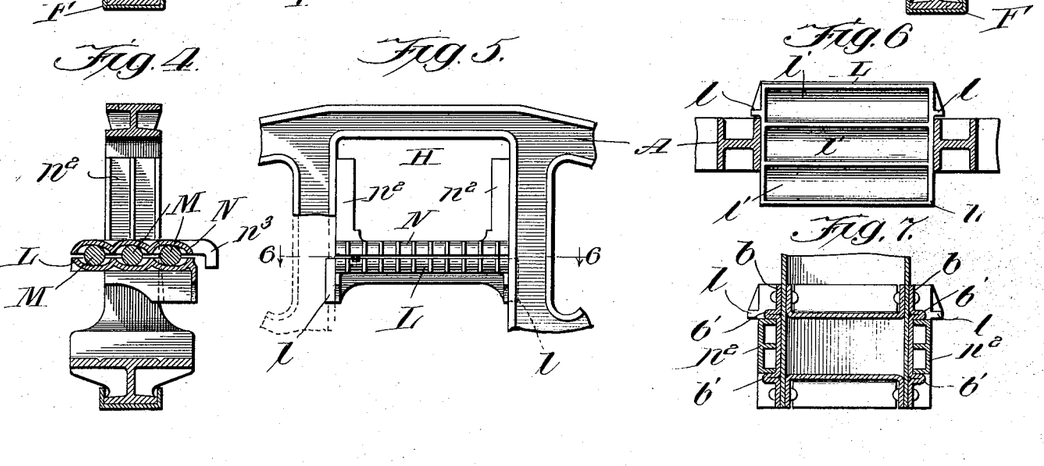
Fig. 4 is a section taken on the same plane as Fig. 3, the bolster being removed however.
Fig. 5 is a side elevation of a portion of one of the side frames with the bolster and springs removed.
Fig. 6 is a section taken on line 6—6 of Fig. 5 looking in the direction of the arrows.
Fig. 7 is a section taken on line 7—7 of Fig. 3 looking in the direction of the arrows.
Figure 8:
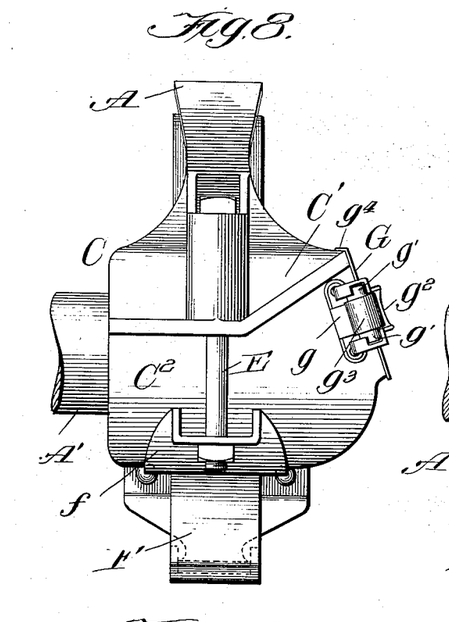
Fig. 8 is an end elevation on an enlarged scale showing the journal box end of one of the side frames.
Figure 9:
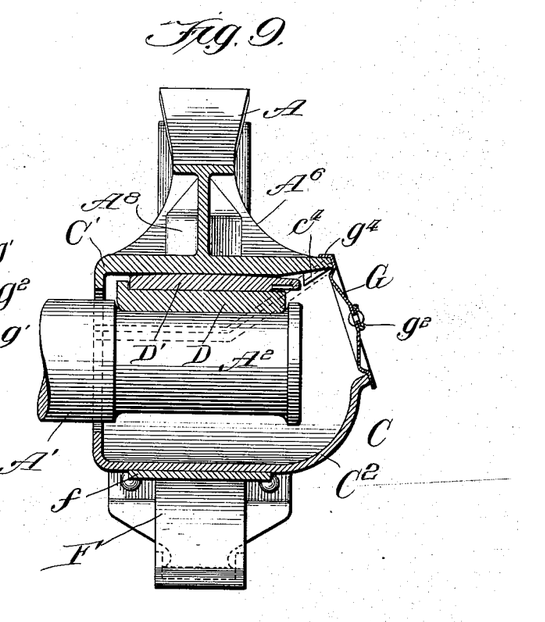
Fig. 9 is a section taken on line 9—9 of Fig. 1.
Figures 10, 11:
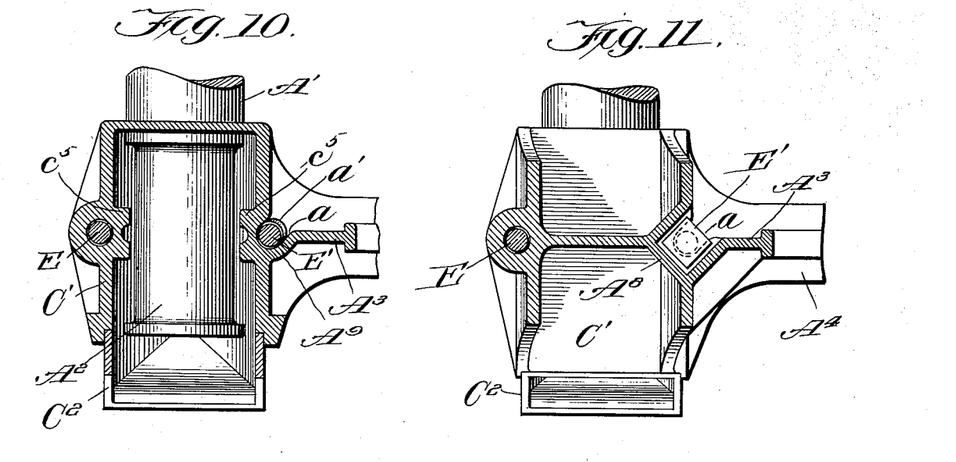
Figs. 10 and 11 are respectively sections taken on lines 10—10 and 11—11 of Fig. 12.
Figure 12:
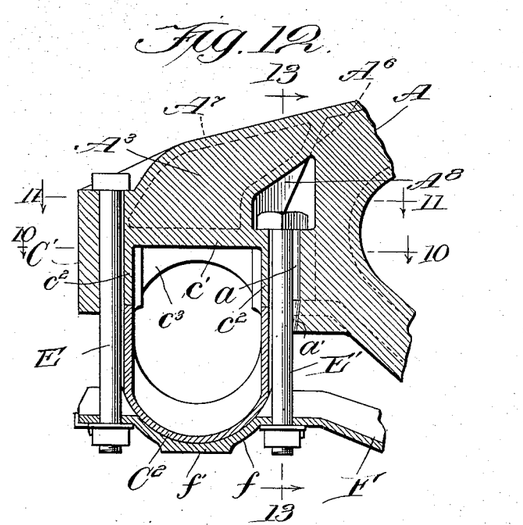
Fig. 12 is a section taken on line 12—12 of Fig. 2 looking in the direction of the arrows.

Since the bolster is inclined slightly with respect to the truck frames in going about a curve, the faces of the lugs $l$ which engage with the frame should preferably be inclined as shown in dotted lines at $l^{10}$ in Fig. 4, so that, when the spring caps are horizontal, only the upper portions of the lugs engage with the side frames. As the bolster is tilted, the plates N and the spring caps are permitted to adjust themselves to the inclination of the bolster before the lower portions of the lugs $l$ engage with the frames. By this means, contact may always be maintained between all of the rollers and the members coöperating therewith and the weight which should be distributed over a set of three rollers need not at any time be carried by a single roller.

It will be seen that, if desired, the lugs $n^3$ on the plates N could be omitted, since the rollers themselves will effectively lock the plates after they have made a predetermined relative movement. However, I prefer to make use of the positive stop. The grooves $l'$ and $n'$ extend practically across the entire widths of the windows and therefore the rollers may be longer than the bolster is wide, affording thereby a large bearing surface irrespective of the width of the bolster itself.

Figure 1:
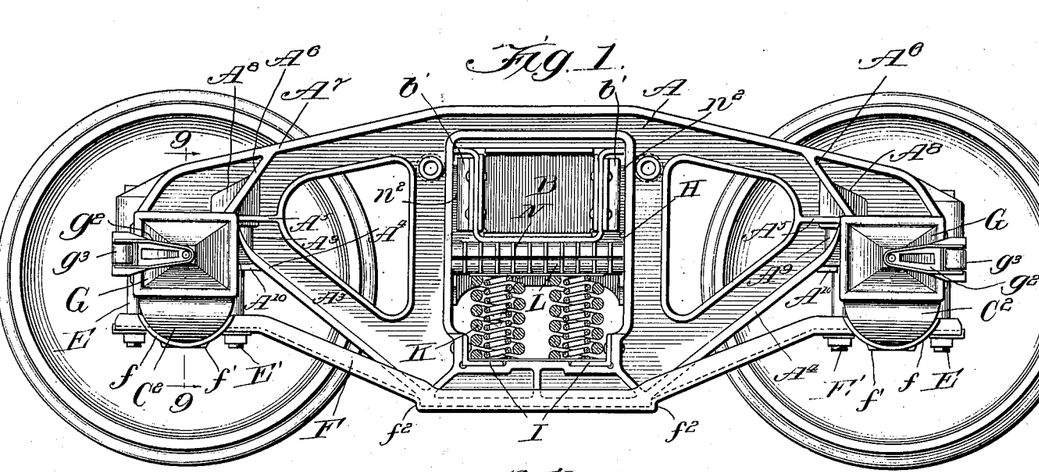
Figure 1 is a side elevation of a truck arranged in accordance with a preferred form my invention.
Figure 2:
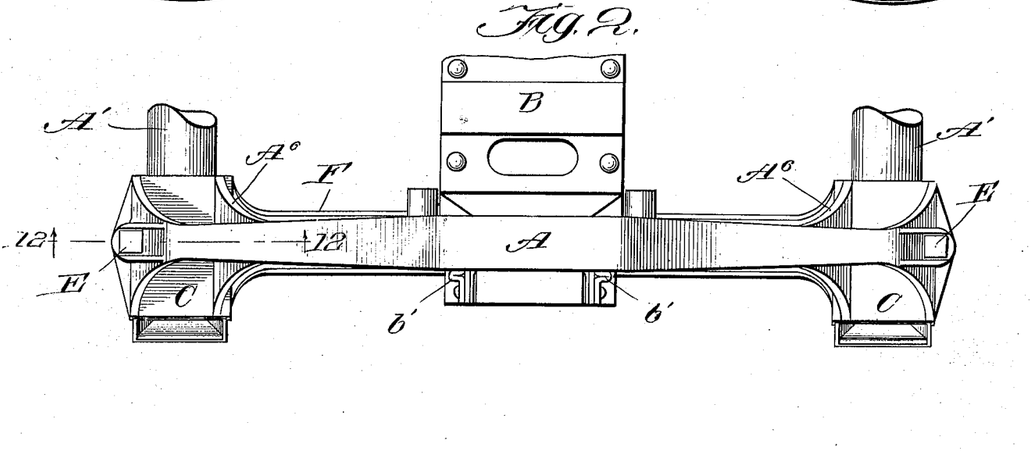
Fig. 2 is a plan view of one side of the truck.
Figure 3:
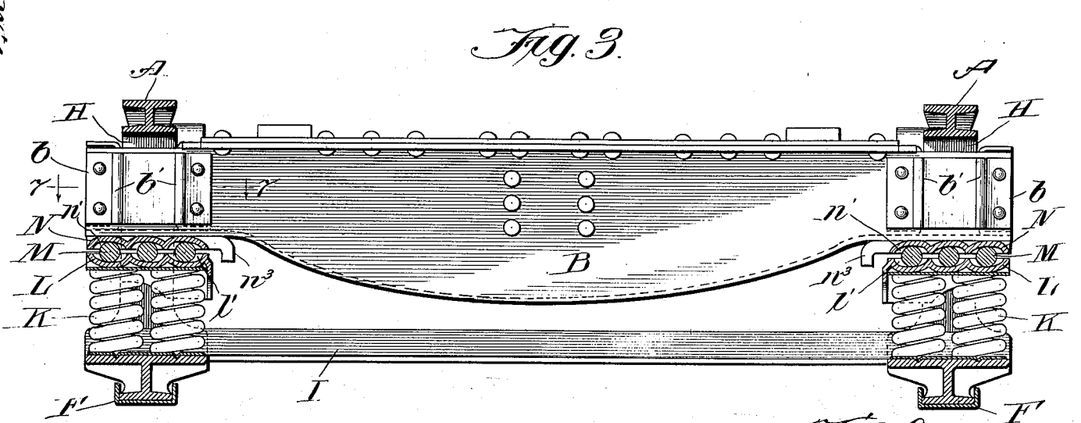
Fig. 3 is a cross-section through the truck at the bolster.

In order to remove the bolster shown in Figs. 1, 2, and 3, the bolster and spring caps are elevated sufficiently to permit the springs to be removed and then the spring cap may be lowered slightly and removed through the interior of the truck. The plates N may also be dropped and removed through either side of the windows, whereupon the bolster may be readily removed through the side of the frame. Where a wide cover plate or other laterally projecting members on the bolster are employed, the bolster may be turned partly on its side so as to let the widest parts pass diagonally through the window, through which the bolster is being removed.

Figure 20:
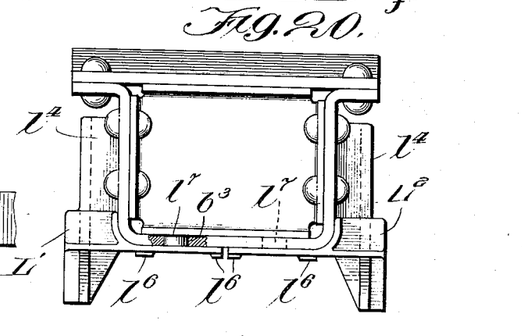
Figs. 20, 21 and 22 show a modified form of spring cap.
Figure 21:
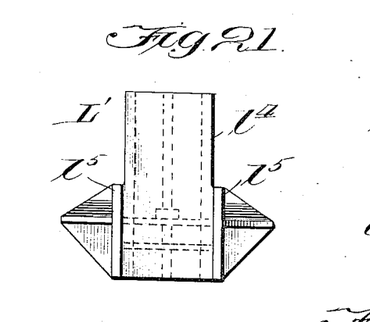
Figure 22:
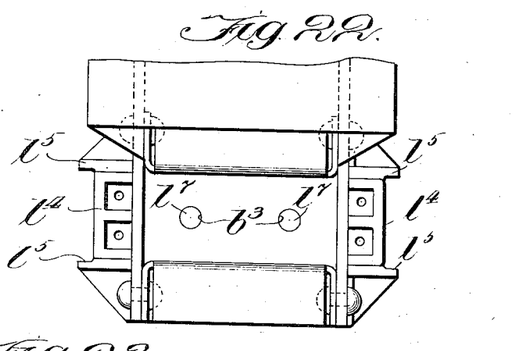

It may not always be desirable to employ the roller device beneath the bolster and, where the rollers are to be omitted, the spring cap itself may be made to serve as the locking device and the filler. In Figs. 20 to 22 I have shown an arrangement of combined spring cap and bolster lock having filling pieces attached, this member being adapted for use where the roller bearings are omitted. The spring cap may, of course, be made in one piece as before, or it may be made in two pieces, $L'$ and $L^2$, each piece being provided with an upwardly projecting arm $l^4$ which is adapted to be positioned between the side of the bolster and the side of the window.

Where the cap is made in two pieces instead of one, each member may be provided with two lugs $l^5$ instead of the single lug $l$, shown in the other modification; one of the lugs $l^5$ on each member being arranged on each side of the frame adjacent the window. After the cap has been placed in position it is prevented from being moved laterally out of the truck frame in either direction by means of the lugs $l^5$. Where the cap is made in two pieces it need not be entered from the inside of the truck, but may be entered from the outside, one piece at a time being placed in position. The cap may be provided with lugs $l^6$ of any desired shape and arrangement for the purpose of engaging with and centering the bolster springs.

Instead of providing the bolster with the plate $b$, as in the other modification, the locking between the bolster and the spring cap may be effected by means of upwardly projecting lugs $l^7$ on the upper faces of the two members of the cap, these lugs being received by openings $b^3$ in the bottom of the bolster. This same method of locking the bolster to the filling member may obviously be employed in the modification previously described; and, in fact, any desired locking arrangement may be used instead of those illustrated.

Figure 13:
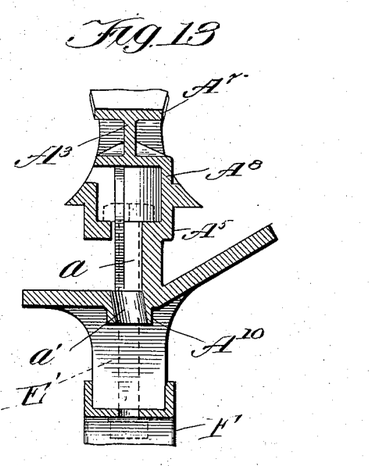
Fig. 13 is a section taken on line 13—13 of Fig. 12 looking in the direction of the arrows.
Figure 14:
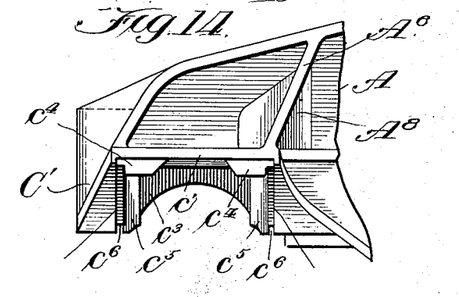
Fig. 14 is a side elevation of the journal box and of one of the side frames, the cellar of the journal box being shown detached.
Figure 15:
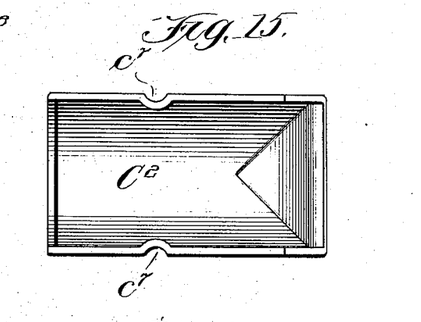
Fig. 15 is a plan view of the journal box cellar.
Figure 16:
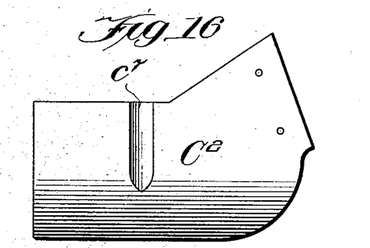
Fig. 16 is a side elevation of the cellar.
Figure 17:
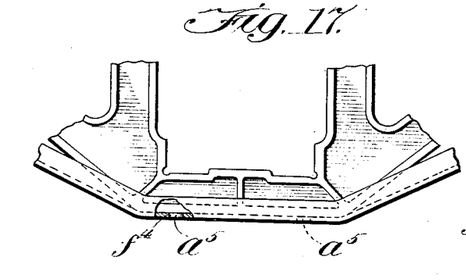
Figs. 17 and 18 are side elevations of portions of one of the side frames showing modified arrangements for attaching the bottom strut.
Figure 18:
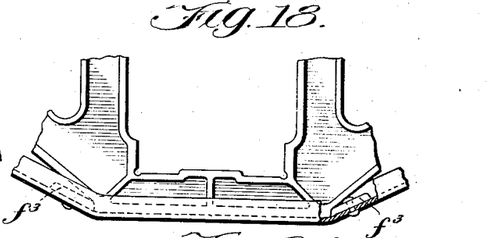
Figure 19:
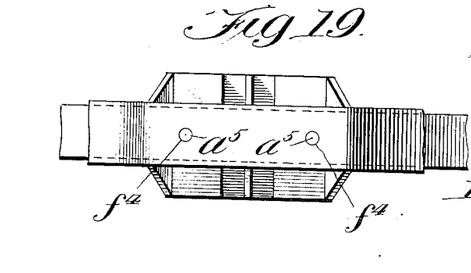
Fig. 19 is a bottom plan view of the frame shown in Fig. 17.

The ties or struts F, to which reference has previously been made, are not of the same importance in the present construction as in the case where the journal boxes are detachably secured to the truck frame, since these struts do not under ordinary conditions bear any considerable stresses. However, they afford protection to the cellars against displacement or injury upon encountering obstructions and they also serve to add rigidity to the journal box and frame in case of derailment. These struts are preferably locked to the side bars in such a manner that projections on the underside of the frames are avoided, thus the struts may be shaped so as to provide shoulders $f^2$ which fit snugly against corresponding shoulders at the ends of the horizontal member of the bottom chord $A^4$, as indicated in Fig. 1. If it is desired to avoid the trouble of making an accurate fit between the shoulders on the strut and the lower chord of the frame, the strut may be provided with small detachable lugs $f^3$, as indicated in Fig. 13, which take the place of the shoulders $f^2$. A further method of tying the strut to the frame is indicated in Figs. 17 and 19, the bottom of the frame being provided with lugs $a^5$ which fit into openings $f^4$ in the strut.

It will now be seen that I have invented a car truck which is simple in construction, rigid and not apt to get out of order; there are weak joints between the portions to which the load is applied and the portions through which it is transmitted to the journal bearings; any desired form of bolster may be employed to advantage in the same truck and may be easily and conveniently placed therein or removed therefrom; all wear due to sliding of the bolsters upon the truck frames may be eliminated, and the momentum of a car in the tangential direction may be absorbed in a most efficient way. There is a further advantage in a truck constructed in accordance with the present invention and that is: the lateral thrust between the bolster and the truck frame is through the shoulders on the combined spring cap and bolster-lock which may readily be placed in or below the plane of the center of the journal bearings, thereby making the truck very stable under lateral forces.

While I have described in detail certain preferred modifications of my invention, I do not desire to be limited to the particular details of construction shown, since in its broader aspects my invention may be carried out in various forms other than those shown and in the appended claims I intend covering not only the forms of my invention illustrated, but also all other forms which come within the definitions constituting the claims.

Having now fully described my invention, what I claim as new and desire to secure by Letters Patent is:

1. In combination, a car-truck side frame having a journal-box crown formed integrally therewith, a journal box cellar coöperating with said crown, and festening means for said cellar including a bolt lying in a passage in the side frame, said passage being arranged to permit the bolt to be positioned by moving it transversely to its axis.

2. In combination, a car-truck side frame having a journal-box crown formed integrally therewith at one end thereof, a cellar coöperating with said crown, and fastening means for said cellar including a bolt having a head resting directly upon the crown and lying in a passage in the frame which permits the bolt to be placed in position and removed by moving it transversely of its axis.

3. In combination, a car-truck side frame having formed integrally therewith at one end a journal-box crown, a cellar coöperating with said crown, and fastening means for said cellar including a bolt having its head bearing directly upon the top of the crown, said frame having a passage for said bolt opening toward the inner side of the frame so as to permit the bolt to be placed in position and removed by moving it transversely of its axis.

4. In combination, a car-truck side frame having a journal-box crown formed integrally therewith and having an open channel on the inner side adjacent to the crown and at right angles to the top of the crown, a cellar coöperating with said crown, and fastening means for said cellar including a bolt lying in said channel and having its head bearing directly upon the top of the crown.

5. A car truck side frame having a central web and top and bottom chords, a journal-box crown formed integrally therewith at one end, the top chord of the frame joining the crown near the outer top edge thereof and the bottom chord joining the inner top edge of the crown, and a set of ribs on opposite sides of the web extending from the upper inner edge of the crown to the top chord at a point above the crown.

6. A car truck side frame having a central web and top and bottom chords, a journal-box crown formed integrally therewith at one end, the top chord of the frame joining the crown near the outer top edge thereof and the bottom chord joining the inner top edge of the crown, a set of ribs on opposite sides of the web extending from the upper inner edge of the crown to the top chord at a point above the crown, and a second set of ribs secured to the web and extending inwardly from the upper inner edge of the crown in the plane of the top of the crown.

7. A car-truck side frame having a central vertical web and top and bottom chords, a horizontal wall integral with one end of the frame, the said top and bottom chords being arranged to join respectively the upper outer and inner edges of said wall, and a set of ribs arranged on opposite sides of the web and extending upwardly and diagonally from the said upper inner edge of the said wall.

8. A car-truck side frame having a central vertical web and top and bottom chords, a horizontal wall integral with one end of the frame, the said top and bottom chords being arranged to join respectively the upper outer and inner edges of said wall, and a set of ribs arranged on opposite sides of the web and extending upwardly and diagonally from the said upper inner edge of the said wall, a journal box member, and fastening means for said member including a bolt having its head bearing directly upon the top of the said wall at the inner edge thereof.

9. A car-truck side frame having a central vertical web and top and bottom chords, a horizontal wall integral with one end of the frame, the said top and bottom chords being arranged to join respectively the upper outer and inner edges of said wall, and a set of ribs arranged on opposite sides of the web and extending upwardly and diagonally from the said upper inner edge of the said wall, a journal box member, fastening means for said member including a bolt having its head bearing directly upon the top of the said wall at the inner edge thereof, said frame having formed therein a channel opening toward the inside of the frame and arranged adjacent and at right angles to said wall, said channel being adapted to receive said bolt.

10. In combination, a car-truck side frame having a central vertical web and top and bottom chords; a journal-box crown formed integrally with the end of the frame; a cellar coöperating with said crown; said frame having a vertical channel arranged adjacent the crown, opening toward the inner side of the frame, and having its axis in the plane of said web; and a fastening bolt for said cellar lying in said channel and having its head bearing upon the top of the crown.

11. In a car truck; side frames having windows, a bolster having its ends extending into said windows; springs beneath said bolster; and means in each window between the bolster upon the springs; said means including a U-shaped device surrounding the bottom and a portion of the sides of the bolster, together with stops for limiting the relative movements thereof with respect to the bolster and the corresponding side frame.

12. A car truck side frame having formed integrally therewith a journal box crown comprising the top wall and portions of each side wall of a journal box, a sheet metal cellar connected with said crown, and means associated with the crown for taking the entire lateral thrust of the axle.

13. In a car truck, side frames each of which has a journal box crown formed integrally therewith at each end thereof; a detachable cellar arranged beneath each journal box crown, and a strut arranged beneath each of said side frames and conforming to the contour of the bottoms of the journal box cellars.

14. In a car truck, side frames each of which has a journal box crown formed integrally therewith at each end thereof, a detachable cellar arranged beneath each crown, and a strut arranged beneath the underside of each of the frames and engaging with the cellars at the opposite ends of the corresponding frame.

15. A journal box comprising a single-piece cast crown and a sheet metal cellar, the crown forming the top and portions of each of the side walls and the cellar forming the bottom and the remaining portions of each of the side walls, and said crown having shoulders on the interior thereof for engaging with a bearing member.

16. In a car truck; a truck frame; a bolster supported in said frame for limited movements laterally thereof; springs carried by the frame beneath the ends of the bolsters; a spring cap above the springs beneath each end of the bolster; a U-shaped member extending around the bottom and the sides of the bolster at each end thereof; stops for limiting the relative movements of each of said U-shaped members relative to the bolster and to the side frames; each of said spring caps having bearing seats registering with bearing seats in the corresponding U-shaped member; and rollers arranged within said seats.

In testimony whereof, I sign this specification in the presence of two witnesses.

DWIGHT GERBER.

Witnesses:
N. W. BELLEVILLE,
R. W. TENER.